(12) United States Patent
Shnitser et al.

(10) Patent No.: US 6,353,673 B1
(45) Date of Patent: Mar. 5, 2002

(54) REAL-TIME OPTO-ELECTRONIC IMAGE PROCESSOR

(75) Inventors: Paul I. Shnitser; Sergey Sandomirsky, both of Irvine; Il'ya Agurok, Long Beach; Aramais Avakian, Pasadena, all of CA (US)

(73) Assignee: Physical Optics Corporation, Torrance, CA (US)

( * ) Notice: Subject to any disclaimer, the term of this patent is extended or adjusted under 35 U.S.C. 154(b) by 0 days.

(21) Appl. No.: 09/560,412

(22) Filed: Apr. 27, 2000

(51) Int. Cl.[7] .............................. G06T 9/00; G06T 5/00
(52) U.S. Cl. ..................... 382/103; 382/191; 382/261; 382/274
(58) Field of Search ................ 382/103, 191, 382/260, 261, 275, 274; 348/169; 359/308; 356/326

(56) References Cited

U.S. PATENT DOCUMENTS

| | | | |
|---|---|---|---|
| 4,647,154 A | | 3/1987 | Birnbach et al. |
| 5,090,807 A | | 2/1992 | Tai |
| 5,166,755 A | | 11/1992 | Gat |
| 5,216,484 A | * | 6/1993 | Chao et al. .................. 356/326 |
| 5,606,413 A | * | 2/1997 | Bellus et al. ............... 356/326 |
| 5,781,336 A | | 7/1998 | Coon et al. |
| 5,828,451 A | * | 10/1998 | Bellus et al. ............... 356/326 |

FOREIGN PATENT DOCUMENTS

| | | |
|---|---|---|
| EP | 133356 | 2/1985 |
| EP | 225205 | 6/1987 |

OTHER PUBLICATIONS

Shnitser, P.I. and Agurok, I.P., "Spectrally adaptive light filtering," Proceedings of SPIE, 1997 p. 157–167, vol. 3140.

Shnitser, P.I., Agurok, I.P., Sandomirsky, S., and Avakian, A., "Spectrally adaptive imaging camera for automatic target contrast enhancement," SPIE, p. 185–195, vol. 3717 (Apr. 23, 1999).

Shnitser, P.I., Agurok, I.P., Sandomirsky, S., and Avakian, A.A., "AOTF–Based Automatic System for Target Contrast Enhancement and Target Tracking," SPIE, 99 p. 148–159, vol. 3584.

Shnitser, P.I., Agurok, I.P., "Fast imaging colorimeter," SPIE, 97, p. 88–99, vol. 3140.

Shnitser, P.I., Agurok, I.P., Sandomirsky, S., "Application of spectrally–adaptive light filtering for automatic target detection," SPIE, 97, p. 138–143, vol. 3159.

"OKSI Opto–Knowledge Systems, Inc. Project Summaries and Press Release," http://www.techexpo.com/www/opto–knowledge/press–rel.html.,(Jan. 13, 2000).

(List continued on next page.)

*Primary Examiner*—Scott Rogers
(74) *Attorney, Agent, or Firm*—Nilles & Nilles, S.C.

(57) ABSTRACT

A system and method for real time optical processing of images by simultaneous combining the variable set of images in selected spectral intervals. Spectral images at a plurality of spectral intervals are collected if needed. According to criteria established in a particular application, coefficients for an optimal combination of selected spectral intervals are calculated. Positive and negative images are continuously captured through the optical filter whose transmission spectrum adjusted to positive and negative coefficients of the optimal combination. Negative images are subtracted from positive images and a sequence of resulting optimized images is displayed in real time.

34 Claims, 10 Drawing Sheets

OTHER PUBLICATIONS

Denes, L.J., Kaminsky, B., Gottlieb, M. and Metes, P. "Image processing using acousto–optical tunable filtering," SPIE, p. 111–121, vol. 2692, 1997.

Suhre, D.R. and Theodore, J.G. "White–light imaging by use of a multiple passband acousto–optic tunable filter," Applied Optics, vol. 35 (No. 22), p. 4494–4501, (Aug. 1, 1996).

Stocker, A.D., Reed, I.S., Yu, X. "Multi–dimensional signal processing for electro–optical target detection," SPIE, p. 218–231, vol. 1305, 1990.

Denes, L.J., Gottlieb, M., Kaminsky, B. "Spectro–Polarimetric Imaging for Object Recognition," SPIE, p. 8–18, vol. 3240, 98.

Tran, C.D., Furlan, R.J., "Amplitude stabilization of a multiwavelength laser beam by an acousto–optic tunable filter," Rev. Sci. Instrum., American Institute of Physics, vol. 65 (No. 2), p. 309–314, (Feb. 23, 1994).

Sturgeon, M.A., Cheng, L.J., et al., "Spectral and polarimetric analysis of hyperspectral data collected by an acousto–optic tunable filter system," SPIE, p. 167–176, vol. 2231, 94.

Gazalet, M.G., Katelik, J.C., Bruneel, C., Bazzi, O., Bridoux, E., "Acousto–optic multifrequency modulators: reduction of the phase–grating intermodulation products," Applied Optics, vol. 32 (No. 13), p. 2455–2460, (May 1, 1993).

Carter, J.A., III, Pape, D.R., Shah, M.L., "Simultaneous Multispectral Imaging with 12 Parallel Channel Tunable Camera," Proceedings of the 1st ARL Acousto–Optic Tunable Filter Workshop, ARL, Adelphi, MD, p. 199–203, Mar. 1997.

Simizu, S., Obermyer, R.T., Thong, C.J., Uschak, M.J., Sankar, S.G., Denes, L.G., Purta, D.A., Gottlieb, M., "An AOTF Camera for Multipectral Imaging," unknown, p. 189–198, Proceedings of the 1st ARL Acousto–Optic Tunable Filter Workshop, ARL, Adelphi, MD, Mar., 1997.

* cited by examiner

REAL-TIME OPTO-ELECTRONIC IMAGE PROCESSOR

BACKGROUND OF THE INVENTION

1. Field of Invention

The present invention is directed to a real-time opto-electronic image processor. In particular, the present invention is directed to a system and method for real-time optical enhancement of imaging object-to-background contrast.

2. Description of Related Art

Presently, it is difficult to track objects, such as endangered wildlife, against varying backgrounds, such as trees or fields. Additionally, aircraft, target and munitions tracking at, for example, flight test center ranges, is becoming increasingly challenging. As the pollution of the surrounding areas of DoD test ranges increases, more pollution is deposited in the air. This pollution causes an increase of airborne particulate, haze, and other phenomenon that reduce visibility. Additionally, aircraft and munitions are moving at higher velocity and some objects are stealthy, making them difficult to track.

A current approach to image enhancement for object tracking involves the use of sensitive infrared cameras and range-gated laser camera systems. Unfortunately, these devices are very expensive. Infrared cameras typically cost tens of thousands of dollars and the cost of range-gated laser camera systems is even more. These approaches are cost prohibitive for intensive use at numerous sites. Another problem with existing systems is that they are active and they "light-up" a target or object. That is, they project light or audio signals onto the object for detection. These projections can inform the object that it is being tracked.

Figure 1A:
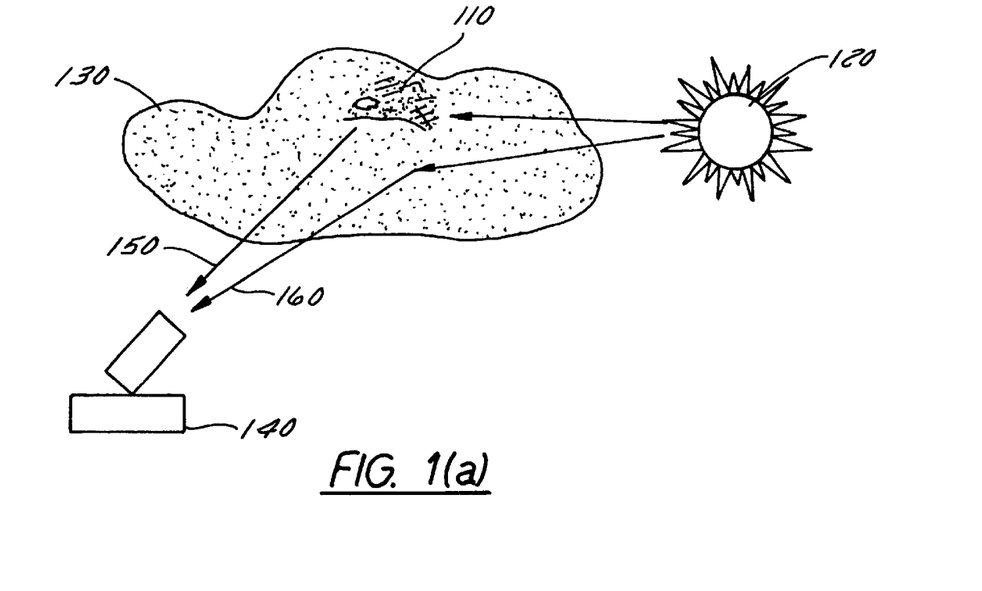
FIG. 1(a) illustrates an exemplary observation scenario of a flying target or object.

FIG. 1(a) illustrates an exemplary observation scenario of a flying target or object 110. The scenario includes the object 110, a sun 120, a cloud 130, a tracker 140, reflected light 150 and scattered light 160. The tracker 140 collects both light scattered 160 in the atmosphere and reflected 150 from an object 110. Therefore, the visibility of the object 110 visibility depends strongly on atmospheric conditions.

The enhancement of object visibility can be achieved by rejecting the signal in those portions of the light spectrum in which the signal from the object 110 is weak but there is a strong signal from the background. Because of strong Rayleigh scattering of blue light, it can be useful to reject the blue portion of the visible spectrum. Although computer algorithms can be used to calculate how these effects influence light propagation in the atmosphere, unfortunately all calculations assume some atmospheric model that can be significantly different from the atmospheric conditions at the point of observation.

SUMMARY OF THE INVENTION

The present invention provides a method and a system for a real-time opto-electronic image processor that uses an Acousto-Optic Tunable Filter (AOTF). Image processing can include, for example, object contrast enhancement, object identification, object detection, object tracking or the like. For object contrast enhancement, spectral images at a plurality of spectral intervals are collected. Object and background spectral parameters are established. Filter coefficients are calculated based upon the object and background spectral parameters for maximizing contrast between the object and background in real time. An acousto-optic filter transmission spectrum is adjusted based upon the calculated filter coefficients. An image is captured through the optical filter corresponding to the adjusted acousto-optic filter transmission spectrum.

This system can enhance the visibility of remote objects under test in adverse weather conditions. When installed on an optical target tracker, this system can automatically adjust its spectral transmission in such a way that the intensity of the background illumination will be reduced significantly while providing minimum reduction of the light reflected from a detected object.

An AOTF under computer control is capable of quickly varying the shape of its spectral transmission curve in the entire visible range. The system automatically analyzes the spectral signatures of the background and of the selected object of interest. It calculates a spectrally matched filter for background suppression and object contrast enhancement. This filtered data then goes directly into the optical channel with minimal computer image processing. The resulting image with the enhanced object contrast can be displayed in real time on a common computer monitor and can be recorded by a VCR.

The system makes flight testing of military equipment more informative and less expensive. It reduces flight test program dependence on weather conditions and allows for the collecting of more data by providing real time images with enhanced object visibility.

The system and method of the present invention is capable of automatic real-time accommodation for particular atmospheric conditions in a point of observation. To make this accommodation, initial spectral information about the object and background may be collected. The proposed system can then track an object and provide real time enhanced images until severe variations in object or background spectra occur. Then, new data may be collected and the cycle of observation can be continued.

BRIEF DESCRIPTION OF THE DRAWINGS

The preferred embodiments of the present invention will be described with reference to the following figures, wherein like numerals designate like elements, and wherein.

DETAILED DESCRIPTION OF PREFERRED EMBODIMENTS

Figure 1B:
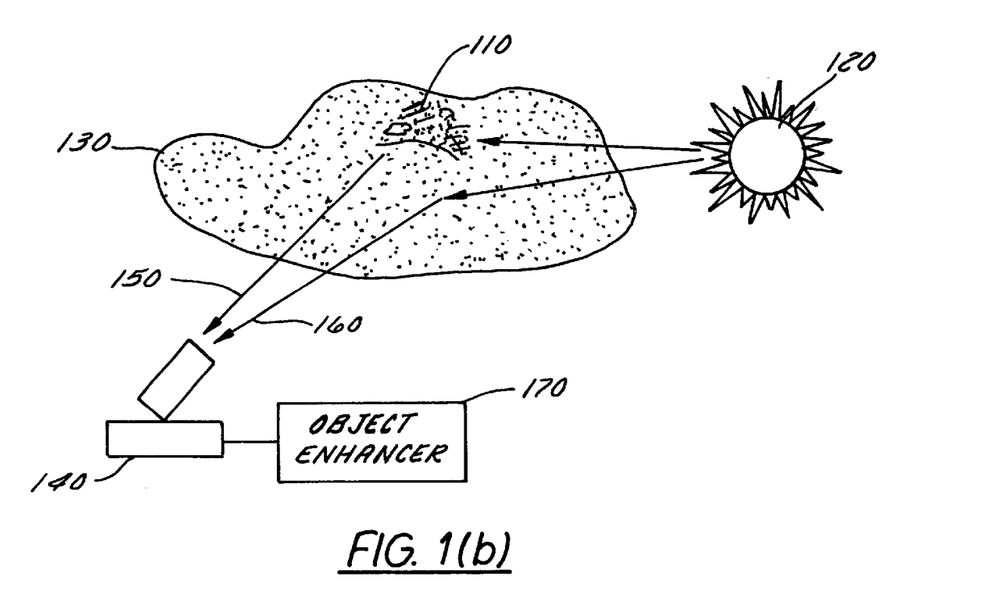
FIG. 1(b) illustrates another exemplary observation scenario of a flying target or object.

FIG. 1(b) illustrates another exemplary observation scenario of a flying target or object 110. The scenario includes the object 110, a sun 120, a cloud 130, a tracker 140, reflected light 150, scattered light 160 and an object enhancer 170. As illustrated in FIG. 1(a), the tracker 140 collects both light scattered 160 in the atmosphere and reflected 150 from an object 110. The object enhancer 170 in FIG. 1(b) can work in conjunction with or be integrated into the tracker 140 to filter out the scattered light 160 in real time as disclosed below. Additionally, the object enhancer 170 may be used separately from the tracker 140 for purposes such as image processing, object identification, contrast enhancement, or the like.

Figure 2:
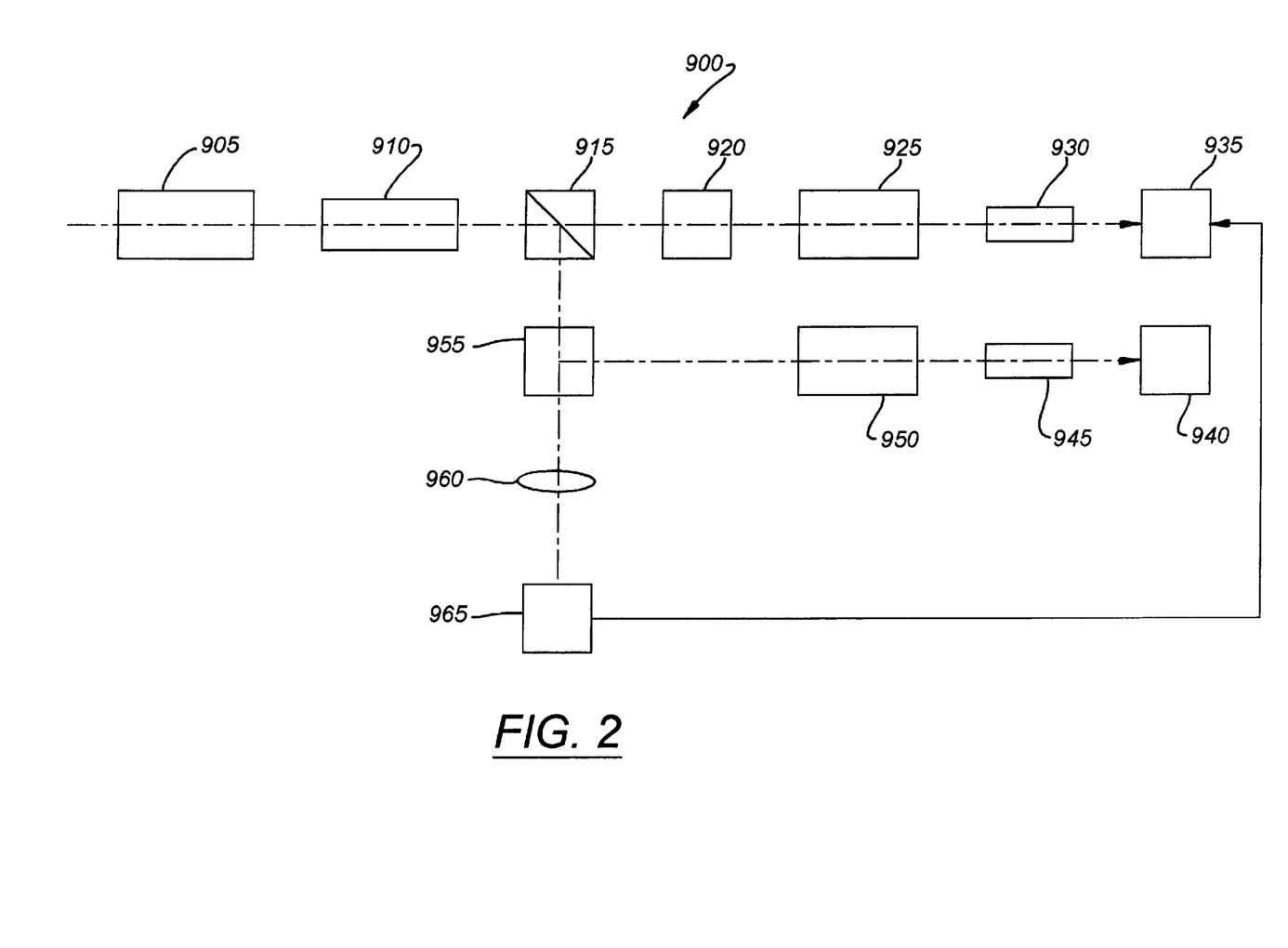
FIG. 2 is an exemplary block diagram of an object enhancer according to one embodiment.

FIG. 2 is an exemplary block diagram of an object enhancer 900, such as object enhancer 170, according to one embodiment. The object enhancer 900 can include a telescope lens 905, a field lens 910, beam splitters 915 and 955, and AOTF 920, matching optics 925 and 950, CCD cameras 930 and 945, a computer 935, a TV monitor 940, focusing optics 960 and a spectrometer 965.

In operation, the object enhancer 900 can receive a signal, such as an image, through the telescope lens 905 and the field lens 910. The signal can be split by beam splitters 915 and 955. The signal can be filtered through AOTF 920 to matching optics 925. The signal can then be received by a CCD camera 930 and sent to a computer 935. The signal can also be sent from beam splitter 955 through matching optics 950 to the CCD cameral 945 and then to the TV monitor 940. The signal can further be sent from beam splitter 955 through focusing optics to a spectrometer 965. The spectrometer 965 can then send a signal to the computer 935.

Figure 3:
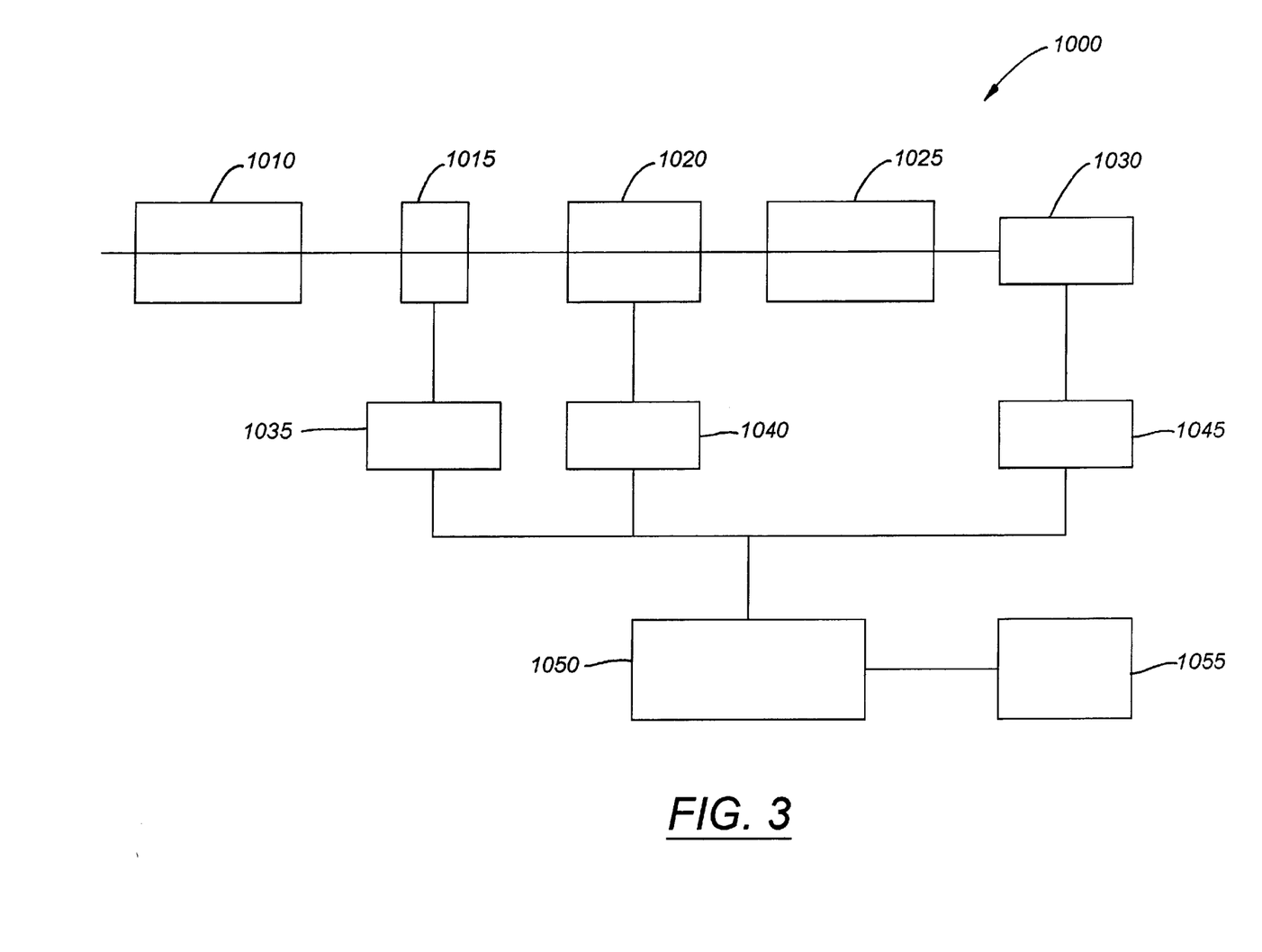
FIG. 3 is an exemplary block diagram of an object enhancer according to another embodiment.

FIG. 3 is an exemplary block diagram of an object enhancer 1000, such as object enhancer 120 according to another embodiment. This embodiment allows the use of light polarization as an additional discriminate to enhance the object contrast. The object enhancer 1000 can include an objective lens 1010, a liquid crystal achromatic rotator of light polarization (LC ARLP) 1015, an AOTF 1020, matching optics 1025, a photodetector such as a CCD camera 1030, a LC ARLP driver 1035, an AOTF driver 1040, a frame grabber 1045, a computer 1050 and a monitor 1055.

In operation, the AOTF 1020 can receive a signal such as an image through front imaging optics such as the objective lens 1010 and the LC ARLP 1015. The AOTF 1020 can transmit a signal such as a filtered image through posterior optics such as the matching optics 1025 to match a filtered image with a photodetector array such as the CCD camera 1030. The frame grabber 1045 can digitize a captured image. The computer 1050 can control the operation of the drivers and the frame grabber. An example AOTF 1020 is a non-collinear $TeO_2$ AOTF that may have an angular aperture of 6° and a linear aperture of 8 mm×8 mm. The AOTF 1020 can be designed to provide full compensation for the dispersion of refractive indices in the $TeO_2$ crystal. Therefore, no image displacement will occur with variation in light transmission wavelength. This object enhancer 1000 can operate efficiently both in the visible light range and in the near-infrared range.

The computer 1050 may include a PCI computer board with an array of sixteen oscillators to drive the AOTF 1020. These oscillators can simultaneously generate a driving signal with a complex spectrum in a frequency range of 100–200 MHz. A switching time of this array of generators can be 2 μs. The amplitude and frequency of each oscillator can be controlled with 14-bit resolution. This exemplary board can be suitable for extension to 32 frequency channels. Therefore, any desired linear combination of transmission intervals in an octave-wide range can be created or changed in the AOTF 1020 within microseconds.

For the LC ARLP 1015, light polarization can be rotated in wide spectral intervals. By combining birefringent materials, it is possible to obtain near-perfect 90 degree rotation, not only at one wavelength, but also in a wide spectral interval. Achromatic rotators with a twisted nematic (TN) LC layer can be used for the LC ARLP 1015 because its performance is independent of the light wavelength. It can be driven by a low voltage, rectangular, electric signal with alternating polarity generated by, for example, an outboard board such as the LC ARLP driver 1035 under computer 1050 control. Without the voltage, the LC ARLP 1015 rotates the polarization of the incident light so the initially vertical polarized light becomes horizontally polarized. This polarization can be used for spectral filtering by the AOTF 1020. The applied voltage cancels rotation of light polarization so initially horizontal polarized light is used for the spectral filtering. The LC ARLP 1015 response to the applied voltage is about 1 ms, while transition to the state without applied voltage takes about 6 ms. A similar rotator of light polarization at 45 degrees can be added to the system to perform the operation with three components of the Stokes vector.

Thus, a complex spectral image of a scene taken at one of two orthogonal polarizations can be captured by a commercial black and white CCD camera 1030 that can operate in an interface mode at 30 frames/second. An analog composite TV signal from the CCD camera 1030 can be digitized by the frame grabber 1045 and then can be used for image processing and displaying.

Figure 4:
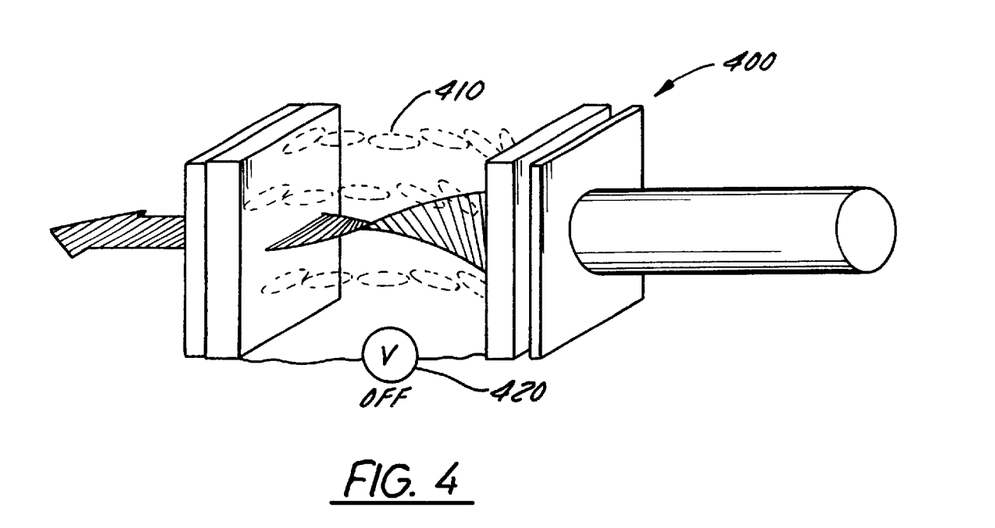
FIGS. 4 and 5 are exemplary illustrations of operating principles of a TN LC achromatic rotator.
Figure 5:
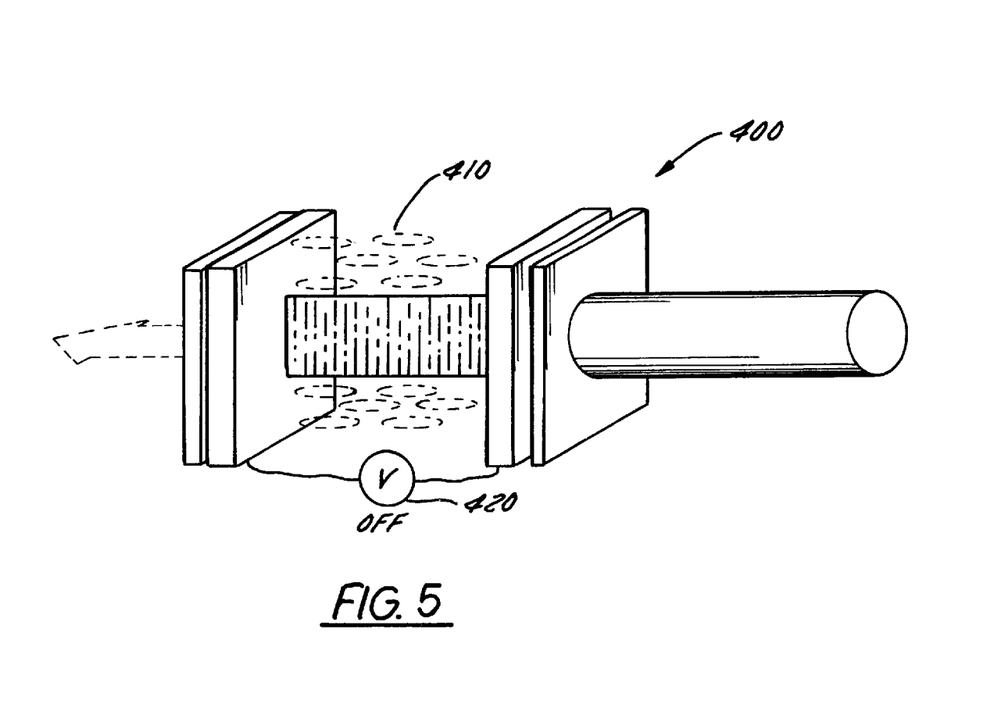

FIGS. 4 and 5 are exemplary illustrations of the operating principles of a TN LC achromatic rotator 400. The rotator 400 can include liquid crystal (LC) 410 and a voltage source 420. Such liquid crystal rotators of polarization are currently commercially available. As illustrated in FIG. 4, when no electric field is applied by the voltage source 420, the LC molecules 410 create a twisted chain that rotates light polarization. As illustrated in FIG. 5, when an electric field is applied by the voltage source 420, the LC 410 are reoriented following the direction of the applied electrical field, and no rotation of light polarization occurs.

Figure 6:
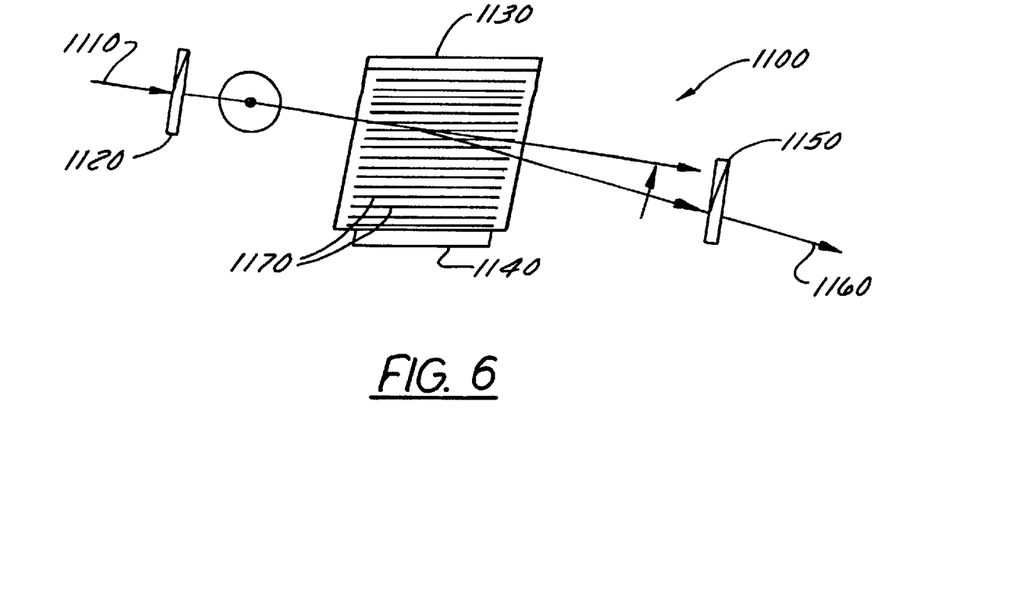
FIG. 6 is an exemplary illustration of a system that shows a principle of operation of an AOTF.

FIG. 6 is an exemplary illustration of a system 1100 that shows the principle of operation of an AOTF such as AOTF 1020. The system 1100 can include incident light 1110, a first polarizer 1120, an acoustic absorber 1130, a piezoelectric transducer 1140, a second polarizer 1150 and selected light 1160. In operation, an image or incident light can enter the system through the first polarizer 1120. The piezoelectric transducer 1140 can create a traveling acoustic wave 1170. The wavelength of the acoustic wave 1170 is defined by the frequency of the driving signal applied to the piezoelectric transducer 1140. Because of an elasto-optic effect, the traveling acoustic wave creates a corresponding phase diffractive grating in crystal in the AOTF 1020. The light portion of incident light with a wavelength defined by the period of the acoustically induced phase grating (i.e. by the frequency of the driving signal applied to the piezoelectric transducer) is diffracted by this grating. The process of light diffraction on the acoustically induced phase grating is accommodated by the rotation of polarization of the diffracted light 90°. The diffracted light 1160 passes through the polarizer 1150. By applying a driving signal with a complex spectrum, several gratings with different periods an amplitudes can be excited in the crystal simultaneously, thus allowing for the simultaneous light diffraction with several wavelengths. This operation of an AOTF illustrates how an acousto optic manipulation can be performed on an image in real time.

Figure 7:
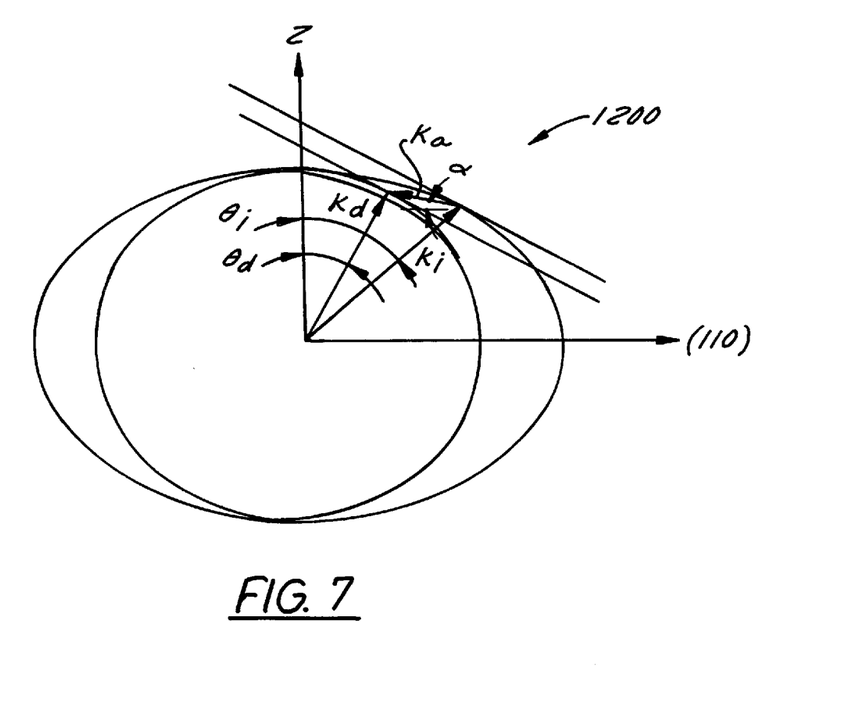
FIG. 7 is an exemplary wave vector diagram of acousto-optic interaction in an AOTF.

FIG. 7 is an exemplary wave vector diagram 1200 of acousto-optic interaction in an AOTF. Vector $k_i$ represents the wave vector of an incident wave. Vector $k_d$ represents the wave vector of a diffracted wave. Vector $k_a$ represents the wave vector of an acoustic wave. To achieve the capability of providing spectral filtering of images, effective light diffraction at the selected light wavelength must be possible for divergent light beams. The possibility is met in the special geometry of light diffraction when tangents to the incident light 1240 (extraordinary beam in the crystal) and for the diffracted beam 1250 (ordinary beam in the crystal) are parallel. This diagram 1200 is a simple illustration of the resulting acousto-optic interaction between the illustrated waves.

Figure 8:
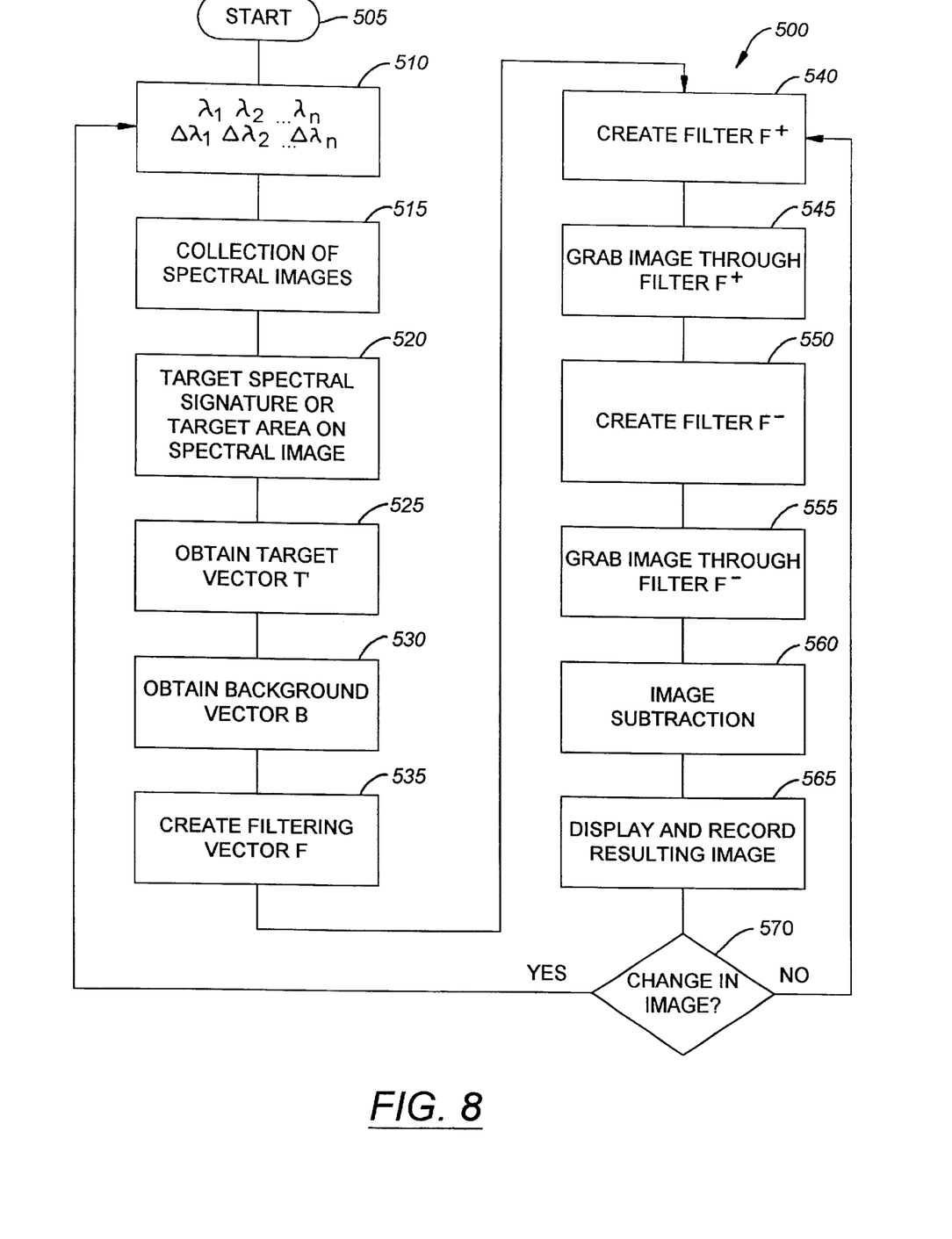
FIG. 8 is an illustration of an exemplary flowchart of system performance of an object enhancer according to one embodiment.

FIG. 8 is an illustration of an exemplary flowchart 500 of the operation of an object enhancer system, such as, for example, object enhancer 900. The flowchart 500 can be implemented using, for example, computer 935 for achieving object enhancement. FIG. 8 shows that spectrally matched filtering can be a linear operation. To accelerate system performance and achieve real time spectrally matched filtering, the unique capability of the AOTF can be utilized to transmit light in numerous spectral intervals simultaneously. This mode of AOTF operation can occur when its driving signal spectrum contains the proper combination of radio frequencies. The amplitude of the corresponding frequency in the driving signal spectrum can define the intensity of transmitted light at each wavelength. By choosing the proper set of frequencies and their amplitudes, the AOTF's transmission of any arbitrary given shape can be approximated.

FIG. 8 illustrates how, for example, data can be sent through a filter in real time for real time tracking of an object. Accordingly, the present invention provides a method for real time optical enhancement of imaging. Spectral images at a plurality of spectral intervals are collected. Object and background spectral parameters are established. Filter coefficients are calculated based upon the object and background spectral parameters for maximizing contrast between the object and background in real time. An acousto-optic filter transmission spectrum is adjusted based upon the calculated filter coefficients. An image is captured through the optical filter corresponding to a set of the calculated filter coefficients.

A related embodiment of the invention according to FIG. 8 provides a method for real time optical enhancement of imaging contrast. A translation from a real time image into a spectral representation of the image is created by using an acousto optic manipulation. The spectral representation of the image is processed into positive and negative discrete spectral coefficients to create a high contrast image determinant adaptive spectral filter. The spectral representation is translated back into a high contrast image.

Initiation of the flowchart begins in step 505. In step 510, initial wavelengths are chosen for analysis. Wavelengths $\lambda_1$, $\lambda_2, \ldots \lambda_3$ can represent the number and position of spectral intervals and wavelengths $\Delta\lambda_1, \Delta\lambda_2, \ldots \Delta\lambda_3$ can represent widths of each spectral interval. In step 515, spectral images are collected in every initial wavelength chosen in step 510. In step 520, a spectral signature or area on a spectral image is targeted or entered for determination of the target vector in step 525. In step 525, the target vector is obtained from the spectral signature or from the area on a spectral image targeted in step 515. In step 530, the background vector is obtained. For example, the background vector may be obtained by sampling pixels of a specific area in an image of the background.

In step 535, the filtering vector F can be created. For example, the filtering vector F can be created according to Equation (1) above or by other useful equations for calculating a filter. In step 540, step the positive filter $F^+$ is created. In step 545, the image is grabbed through the positive filter $F^+$. Physically, the filtering may be done by applying a driving signal with a complex frequency spectrum to an AOTF. Such a driving signal can be generated by a signal synthesizer or by an array of frequency generators. In step 550, the negative filter $F^-$ is created. In step 555, the image is grabbed through the negative filter $F^-$. Steps 540–555 may be repeated or implemented in varying order to obtain varying images through the different filters. Thus, the steps 535, 540 and 550 can calculate filter coefficients based upon object and background spectral parameters for maximizing contrast between the object and background in real time.

In step 560, image subtraction is performed on the images grabbed at varying wavelengths through the filters. This subtraction may be performed using a processor or computer. In step 565, the resulting image can be displayed and/or recorded. In step 570, it is determined if the image has undergone a substantial change. For example, it is determined if the background has dramatically changed or if the object has left the area of view. If the image has not substantially changed, flow of the process returns to step 540 for continued processing and display of the image. If the image has substantially changed, flow of the process can return to step 510 for redetermination or reestablishment of initial parameters. Flow of the process may additionally return to, for example, steps 515, 520, 525, 530 or 540 depending on how much initial processing is desired to be redone. The determination of step 570 may be performed by monitoring of the background according to FIG. 9.

Figure 9:
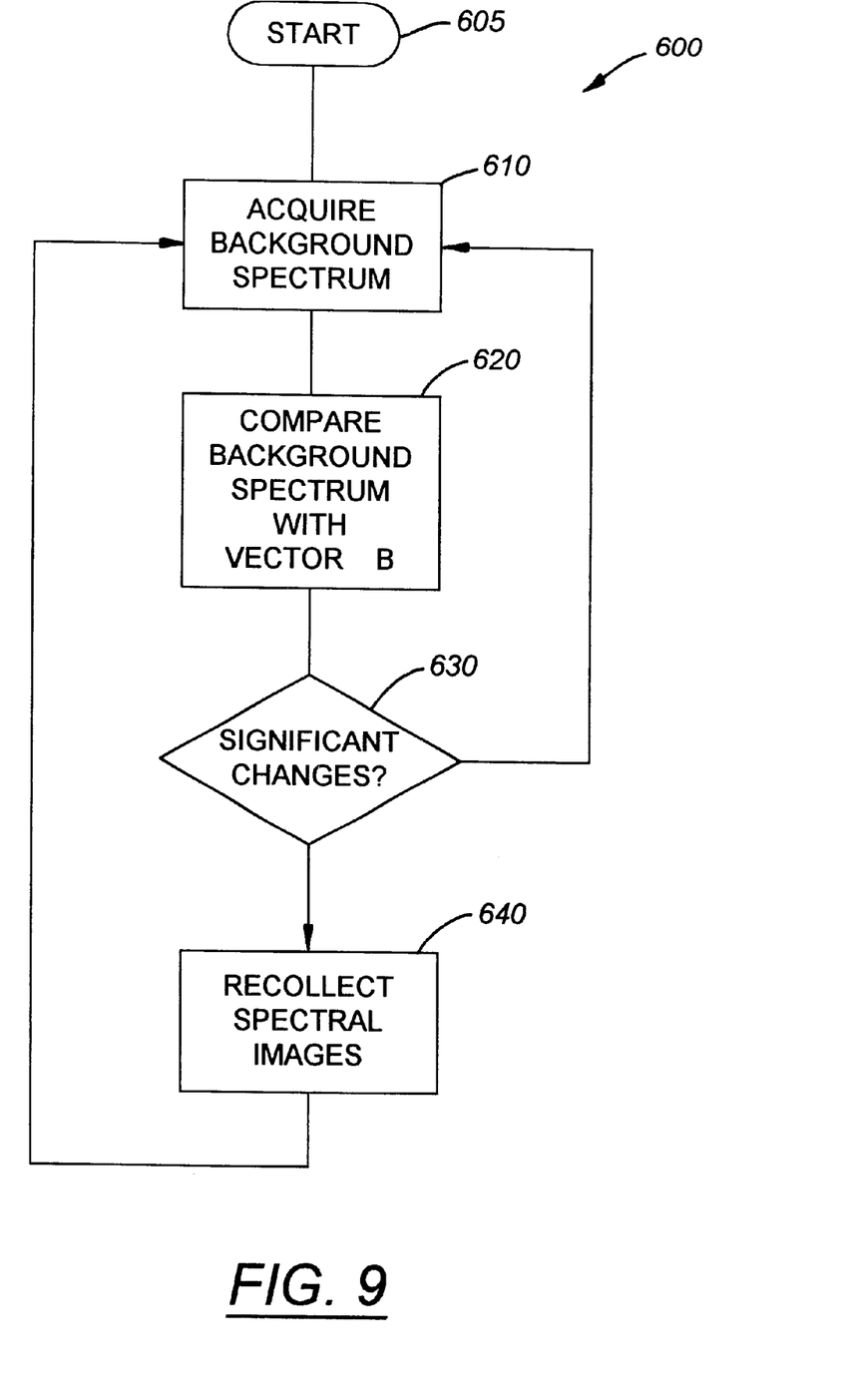
FIG. 9 is an exemplary illustration of a flowchart for monitoring a background of an image in an object enhancer.

FIG. 9 is an exemplary illustration of a flowchart 600 step for monitoring a background of an image in an object enhancer. Initiation of the flowchart begins in step 605. In step 610, step the object enhancer acquires a background spectrum. In step 620, the object enhancer compares the background spectrum with a background vector B. In step 630, the object enhancer determines if there are significant changes in the background based on the comparison performed in step 620. If there are no significant changes, the object enhancer continues monitoring the background by returning to step 610. If there are significant changes, the object enhancer can recollect the spectral images in step 640 and return to step 610 for additional monitoring. This monitoring process can be done concurrently with the filtering process of FIG. 5 to cause, for example, the recollection of the spectral images in step 520 when the background changes significantly.

Figure 10:
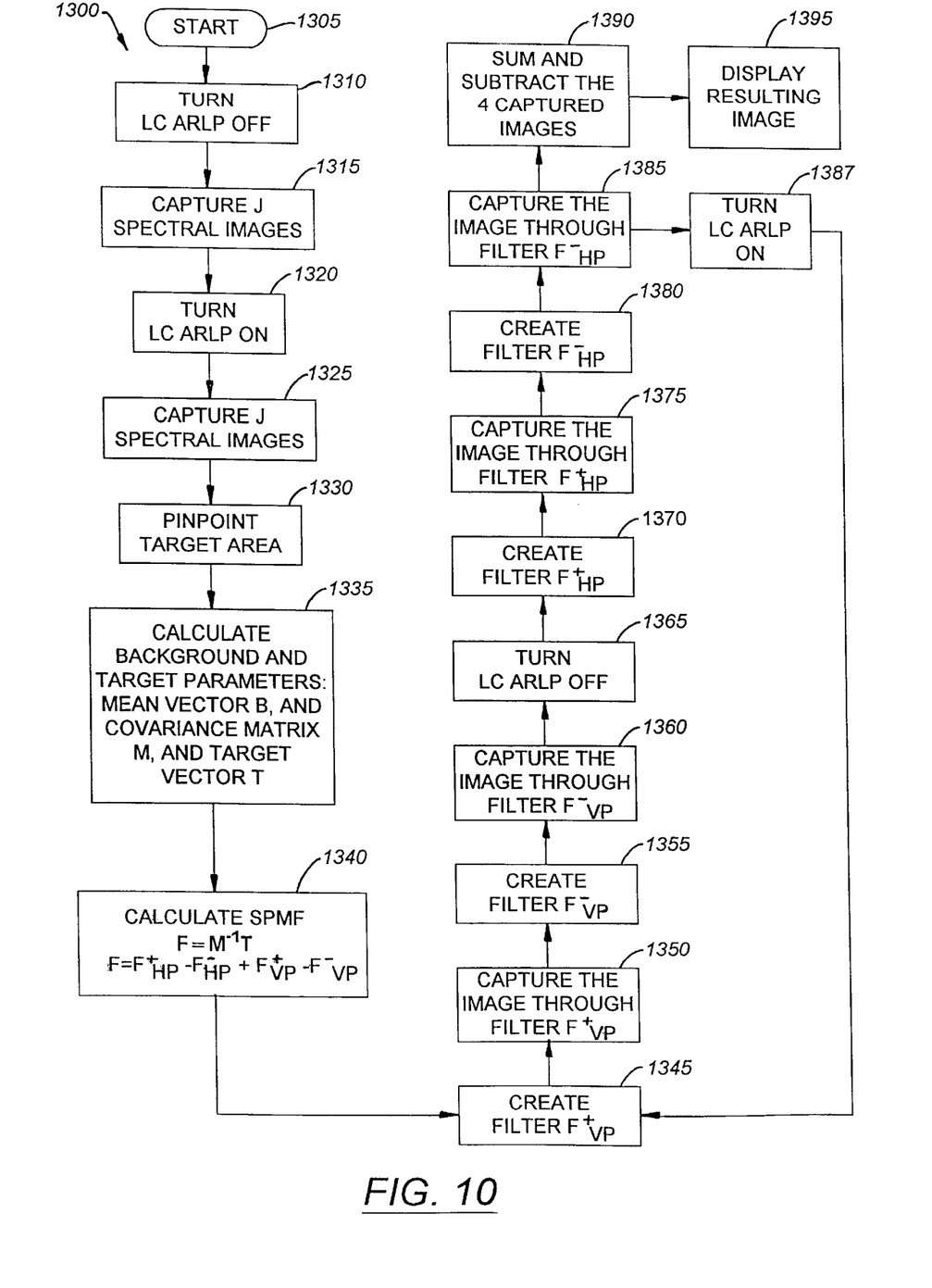
FIG. 10 is an illustration of an exemplary flowchart of another embodiment of system performance of an object enhancer.

FIG. 10 is an illustration of an exemplary flowchart 1300 of the operation of another embodiment of an object enhancer, such as, for example, object enhancer 1000 using a Spectrally Polarimetric Matched Filter (SPMF). A SPMF can be used in the object enhancer 1000 by using a combination of, for example, the LC ARLP 1015 and the AOTF 1020. Initiation of the process begins in step 1305. In step 1310, the LC ARLP is turned off. In step 1015, J spectral images are captured. In step 1320, the LC ARLP is turned on. In step 1325, another J spectral images are captured. In step 1330, a target area is pinpointed. In step 1335, background, target parameters, mean vector B, covariance matrix M and target vector T are calculated. These values can be calculated in accordance with the procedures outlined in FIGS. 11 and 12 and procedures further described below. In step 1340, the SPMF is calculated by using $F=M^{-1}T$, $F=F^+_{HP}-F^-_{HP}+F^+_{VP}-F^-_{VP}$. The SPMF filter F consists of four portions $F^+_{HP}$, $F^-_{HP}$, $F^+_{VP}$, and $F^-_{VP}$, where HP means horizontal polarization, VP means vertical polarization, and + and − stand for positive and negative coefficients, respectively. Therefore, 4 frames are used for grabbing images through these four portions of the filter, F. By using a commercial CCD camera 1030 with the common speed of 30 frames per second, this system is capable of generating images with an enhanced contrast at the speed of about 7.5 frames per second. Employing the faster camera, frame grabber, and more powerful video adapter creates an opportunity to develop a spectro-polarimetric imaging system that operates at a speed close to 30 frames/s.

In step 1345, step filter $F^+_{VP}$ is created. In step 1350, an image is captured through the filter $F^+_{VP}$. In step 1355, filter $F^-_{VP}$ is created. In step 1360, an image is captured through the filter $F^-_{VP}$. In step 1365, the LC ARLP is turned off. In step 1370, filter $F^+_{HP}$ is created. In step 1375, an image is captured through the filter $F^+_{HP}$. In step 1380, filter $F^-_{HP}$ is created. In step 1385, an image is captured through the filter $F^-_{HP}$. Flow may then proceed in parallel to steps 1390 and 1387. In step 1387, the LC ARLP is turned on and the flowchart advances to step 1345. In step 1390, the captured images are summed and subtracted. In step 1395, the resulting image is displayed. Thus, while the image is being displayed, further images are being processed for further display. Flowchart 1300 provides for the enhancement of target visibility over a cluttered background which can be achieved through the employment of differences both in spectrum and in polarization of light reflected from a background B, and light reflected from a target T.

Figure 11:
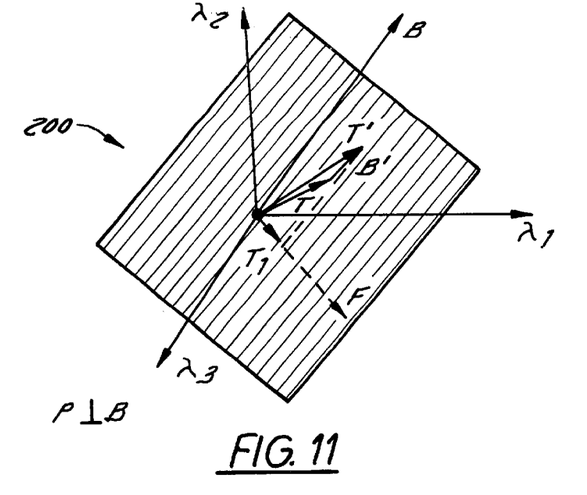
FIG. 11 is an illustration of an exemplary approach to object enhancement based on differences in spectra of light reflected from an object and of scattered light.

FIG. 11 is an illustration of an exemplary approach to object enhancement based on differences in the spectra of the light reflected from an object and of the scattered light. This approach is useful for creating filtering vector F from a background vector B and a target vector V for an object enhancer such as, for example, object enhancers 170, 900 and 1000. step FIG. 11 illustrates a multidimensional space 200 where each axis $\lambda_1$, $\lambda_2$ and $\lambda_3$ represents a light intensity in a given spectral interval. The vector B in this space can describe the light from a homogenous background. The vector T corresponds to the light reflected from a target or object such as object 110. The vector B' represents light scattered in an atmosphere between the object and the telescope and the vector T' represents the object with the additional scattering of B'. A light path through a spectral filter can be described as $T_1$ which is a projection of the light vector on the direction of the filter vector F.

Object contrast enhancement can be achieved if the only light reflected from the object will illuminate a photodetector array while a spectral filter will reject the scattered light. FIG. 11 illustrates that for such a situation, the filter vector F should be perpendicular to the background vector B and should be located in the plane P where both vectors B and T are located.

Similar considerations are applicable for a larger number of spectral intervals used for observation. The filter vector F can be calculated by the formula $$F = T' - \frac{(B \cdot T')}{(B \cdot B)^{1/2}(T' \cdot T')^{1/2}} \quad (1)$$

Where $$B(\lambda_i) = \sum_{m=1}^{k}\sum_{n=1}^{l} I_{mn}(\lambda_i) \quad (2)$$

which is a k×l grid of pixels in an entire frame used for the calculation of the background spectral signature B, and $$T'(\lambda_i) = \sum_{m=1}^{p}\sum_{n=1}^{q} I_{mn}(\lambda_i) \quad (3)$$

which is a p×q grid of pixels in a small rectangle that is pointed at the object at any spectral frame which is used for calculating the object spectral signature or vector T.

A light intensity can be only a positive number. Therefore, spectral vectors B and T always lay in a sector in the multidimensional spectral space that has only positive coordinates. This means that a vector F that is perpendicular to B must have at least one negative projection on spectral axis (F·B =0). Of course, no optical spectral filter can produce negative light intensity. To accomplish an optimal spectral filtering for object contrast enhancement, a computer image subtraction is used. In this case, two images must be taken. The first of them is taken through a spectral filter, such as AOTF 920 or AOTF 1020, with a transmission curve that corresponds to the full set of vector F components that have a positive value ($F^+$). The second is taken through the spectral filter, such as AOTF 920 or AOTF 1020, with a transmission curve that corresponds to the full set of vector F components that have a negative value ($F^-$). Because the technology of the spectrally adaptive light filtering with an AOTF allows for very fast variations in filter transmission (few tens of microseconds), each next image frame can be taken through a different spectral filter. Computer subtraction of the two images is also a relatively fast operation. This allows for almost real time (half of the CCD frame rate) imaging with enhanced object contrast.

Figure 12:
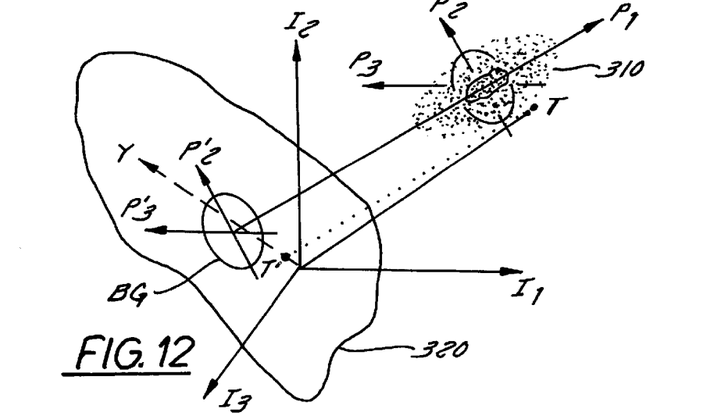
FIG. 12 is an exemplary illustration of spectrally matched filtering for a non-uniform background.

The description of the background spectral signature by vector B is correct only for uniform backgrounds. In some cases, several different objects can be seen simultaneously in the field of view of the optical tracker. For example, the background may be a sky and a terrain or clear sky and a cloud, etc. In this case, each pixel in the background has its own vector in multi-dimensional spectral space. FIG. 12 is an exemplary illustration of spectrally matched filtering for a non-uniform background. FIG. 12 illustrates how the ends of these vectors create a scatter plot in spectral space.

Figure 13:
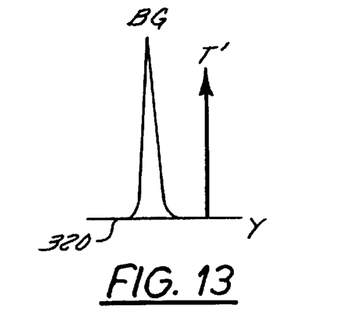
FIG. 13 is an exemplary illustration of the distribution of background intensity along a filter direction.

FIG. 12 shows a projection of a scatter-plot 310 and object vector T on a plane 320 perpendicular to the first principal component $P_1$ and containing the second principle component $P_2$ and the third principle component $P_3$. The direction of the filter F can be found as a line passing through the intersection of $P_2$ and $P_3$ and a point that is the projection of the target vector T. FIG. 13 is an exemplary illustration of the distribution of the background BG intensity along the filter direction Y and a target intensity T' that is separated from the background in this projection. In most cases, the filter direction may be a Gaussian curve.

The enhancement of object visibility can be achieved in this case by spectrally matched filtering. Spectrally matched filtering can be viewed as an appropriate weighted combination of principal spectral components. The axes of the principal spectral components coincide with the axes of the ellipse of the data probability distribution; they are the eigen vectors of the covariance matrix M. The coefficients of this symmetrical matrix are second order moments of the probability distribution in the background data, for zero-mean distribution, for example, for zero first-order moments. In other words, the coefficient $M_{ij}$ is the measure of correlation between the data and the i-th and j-th spectral bands:

$$M_{ij} = 1/N \sum_{k=1}^{N} x_{ik} x_{jk} \quad (4)$$

where $x_{pk}$ is the value of the p-spectral component in the k-pixel's spectral data vector after mean removal.

The spectrally matched filter can be described as a vector in multidimensional color space. Its performance, i.e. multiplication of each spectral image on the weight coefficient $F_i$, is the dot vector product operation that projects a spectral vector for each pixel to the direction of the filter vector.

In the highly correlated backgrounds, the scatter plot ellipsoid BG is strongly elongated and there is a small probability of improving object contrast by projecting the image in a direction coinciding with the direction of the long axis P'$_2$ of the ellipsoid BG. The significantly higher probability of finding an object occurs when filter vector Y lies in the plane perpendicular to this axis. As illustrated in FIG. 3, the direction of the filter vector Y must be close to the direction of projection of object vector T' to this plane. When the direction of the filter vector Y is chosen in the system coordinate associated with principal axes, it is easy to find this vector in the original coordinates of light intensities at various spectral intervals.

Calculation of the filter vector F can require knowledge of background and object spectral signatures. This information can be collected at the initial stage of observation by grabbing and storing in a computer memory several spectral images taken through the same filter. The object spectral signature may be obtained by analyzing a set of object image information in an initial spectral image collection in an initial phase of observation. This information about the position of the object can be provided either from another sensor, such as radar, or by an operator by clicking a computer mouse at the object area.

Once the object spectral signature is obtained, the system can enhance the object's contrast automatically until the significant changes in the background occur. For example, an object passing through a cloud can cause such changes. To obtain an indication of the background variation, the system design can include a small spectrometer illuminated by a portion of the light collected by the optical telescope. The spectrometer can compare the background spectrum with the initial data and can raise an alarm signal in the case of significant variations in the spectrum shape. In this case, either the background spectrum from the spectrometer can be used for calculation of a new filter vector or the new cycle of collecting spectral information can be initiated. It is important to notice that, for example, sixteen spectral frames can be captured in about 0.5 s if a CCD camera with common 30 frames per second operational speed is used.

Figure 14:
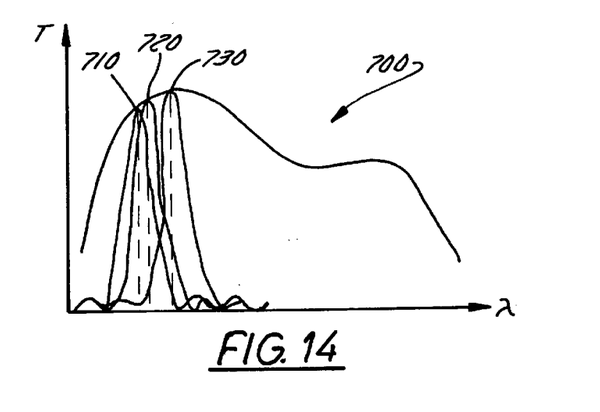
FIG. 14 is an exemplary illustration of a graph of an AOTF transmission curve.

FIG. 14 is an exemplary illustration of a graph of an AOTF transmission curve. The curve 700 represents the AOTF spectral transmission curve and its approximation by a set of AOTF spectral responses 710–730 to a single frequency signal. As illustrated, the curve 700 is plotted along a spectral transmission T as a function of wavelength λ. By applying a complex driving signal to an AOTF, any desirable shape of the AOTF spectral transmission curve can be reproduced in an octave-wide spectral range. Such complex driving signals for AOTFs can be generated by a signal synthesizer or by an array of signal generators. For example, a signal synthesizer can be used for the AOTF driver 1040 of FIG. 3.

Figure 15:
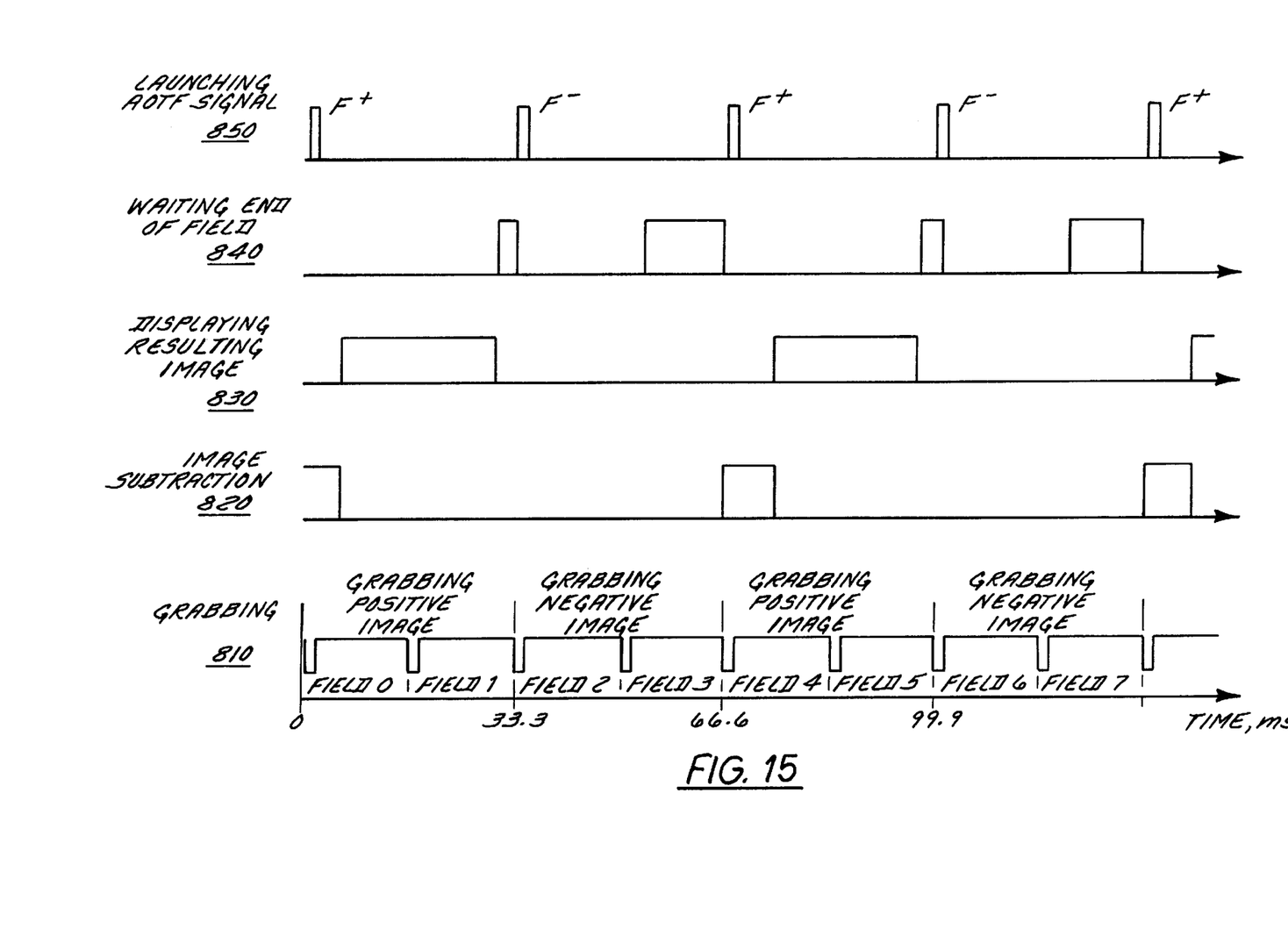
FIG. 15 is an exemplary illustration of a timing diagram of an experimental object enhancer performance.

FIG. 15 is an exemplary illustration of a timing diagram 800 of an experimental object enhancer performance. FIG. 15 illustrates how relatively fast object enhancement can be achieved by the disclosed invention. The diagram 800 includes the timing 810 of the grabbing of the positive and negative image signals, the timing 820 of the image subtraction signal, the timing 830 of the displaying of the resulting image signal, the timing 840 of a waiting end of field signal, the timing 850 of the launching AOTF.

The method of this invention is preferably implemented on a programmed processor. However, the method may also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which resides a finite state machine capable of implementing the flowcharts shown in the FIGS. may be used to implement the processor functions of this invention.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. A method of real-time optical processing of images by simultaneously combining a variable set of images in various orientations of light polarization and in selected spectral intervals comprising the steps of:

turning a liquid crystal achromatic rotator of light polarization off;

selecting a set of spectral intervals;

adjusting transmitting spectrum of an optical filter to a first selected spectral interval;

acquiring a spectral image through the adjusted optical filter;

turning the liquid crystal achromatic rotator of light polarization on;

repeating the above steps for orthogonal light polarizations, for each selected spectral interval;

defining an object area;

extracting object and background spectral-polarimetric parameters from the set of spectral-polarimetric images;

calculating an optimal set of weight coefficients for each spectral-polarimetric interval satisfying application criteria;

adjusting a filter transmission spectrum to positive weight coefficients for corresponding spectral intervals to create a positive filter;

capturing an image through the positive filter at a relevant polarization;

adjusting a filter transmission spectrum to negative weight coefficients for corresponding spectral intervals to create a negative filter;

capturing an image through the negative filter at a relevant polarization;

subtracting the image captured through the negative filter from the image captured through the positive filter;

recording and displaying the resulting image.

2. The method of claim 1, further comprising cycling through the method of real time optical processing of images, wherein an orientation of light linear polarization and at least one of the number of spectral intervals, their position and the spectral width of each of these intervals can be varied in each cycle.

3. The method of claim 1, further comprising:

monitoring spectral parameters of background of an image;

determining if the background spectral parameters deviate significantly from established background spectral parameters; and reextracting the object and background spectral parameters if the background spectral parameters deviate significantly from the established background spectral parameters.

4. A system for real-time optical processing of images by simultaneously combining a set of images in different orientations of light linear polarization, in selected spectral intervals comprising:

an objective lens;

a liquid crystal achromatic rotator of light polarization;

an acousto-optic tunable filter coupled to the objective lens;

an image capture device coupled to the acousto-optic tunable filter;

a liquid crystal achromatic rotator of light polarization driver;

a multi-frequency generator connected to the acousto-optic tunable filter; and a processor coupled to the multi-frequency generator which controls the multi-frequency generator and the liquid crystal achromatic rotator of light polarization driver, calculates object and background spectral parameters, monitors changes of background spectral parameters, calculates weight coefficients for optimal image processing, and performs image subtraction.

5. A method for real time optical enhancement of imaging contrast between an object and a background comprising the steps of:

establishing object and background spectral-polarimetric parameters;

calculating filter coefficients based upon the object and background spectral-polarimetric parameters for maximizing contrast between the object and background in real time;

adjusting an acousto-optic filter transmission spectrum based upon the calculated filter coefficients; and capturing an image through a relevant orientation of the liquid crystal achromatic rotator of light polarization and an acousto-optic filter having the transmission spectrum based upon the calculated filter coefficients.

6. The method of claim 5, further comprising choosing initial orientations of light polarization and wavelengths for analysis.

7. The method of claim 5, further comprising:

monitoring the background spectral-polarimetric parameters of an image;

determining if the background spectral-polarimetric parameters deviate significantly from the established background spectral-polarimetric parameters; and reestablishing the object and background spectral-polarimetric parameters if the background spectral-polarimetric parameters deviate significantly from the established background spectral-polarimetric parameters.

8. The method of claim 7, wherein the step of determining if the background spectral-polarimetric parameters deviate significantly from the established background spectral-polarimetric parameters compares the background spectral-polarimetric parameters to a background vector.

9. The method of claim 5, further comprising targeting an object area on a spectral image, wherein the step of establishing the object and background spectral-polarimetric parameters establishes the object and background spectral-polarimetric parameters based on the targeted spectral area.

10. The method of claim 5, wherein the step of capturing an image through the optical filter corresponding to a set of the calculated filter coefficients subtracts images captured through one filter from images captured through another filter.

11. The method of claim 5, further comprising displaying the image captured through the optical filter corresponding to a set of the calculated filter coefficients.

12. A method for real time optical enhancement of imaging contrast comprising the steps of:

acquiring a set of real time images;

creating a translation from the set of real time images into a spectral-polarimetric representation of the set of real time images by using a liquid crystal achromatic rotator or light polarization and an acousto-optic filter;

processing the spectral-polarimetric representation of the set of real time images into positive and negative discrete spectral coefficients to create a high contrast image determinant adaptive spectral-polarimetric filter; and translating the spectral-polarimetric representation of the set of real time images into a high contrast image using the high contrast image determinant adaptive spectral-polarimetric-filter.

13. The method of claim 12, further comprising choosing initial orientations of light polarization and wavelengths for use in creating the translation.

14. The method of claim 12, further comprising:

monitoring background spectral-polarimetric parameters of an image;

determining if the background spectral-polarimetric parameters deviate significantly from established background spectral-polarimetric parameters; and recreating a translation, reprocessing the spectral-polarimetric representation and retranslating the spectral-polarimetric representation if the background spectral-polarimetric parameters deviate significantly from the established background spectral-polarimetric-parameters.

15. The method of claim 14, wherein the step of determining if the background spectral-polarimetric parameters deviate significantly from the established background spectral-polarimetric parameters compares the background spectral-polarimetric parameters to a background vector.

16. The method of claim 12, further comprising targeting an object area on a spectral image.

17. The method of claim 12, further comprising subtracting images captured through a positive discrete spectral-polarimetric coefficient filter coefficient from images captured through a negative discrete spectral-polarimetric coefficient filter.

18. The method of claim 12, further comprising storing and displaying the high contrast image.

19. A system for optical enhancement of imaging contrast comprising:
   an objective lens;
   a liquid crystal achromatic rotator of light polarization;
   an acousto-optic tunable filter coupled to the objective lens;
   an image capture device coupled to the acousto-optic tunable filter;
   a liquid crystal achromatic rotator of light polarization driver;
   a multi-frequency generator connected to the acousto-optic tunable filter; and
   a processor coupled to the multi-frequency generator which controls liquid crystal achromatic rotator of light polarization the operation, and calculates filter coefficients for the multi frequency generator.

20. The system according to claim 19, wherein the multi-frequency generator comprises an acousto-optic tunable filter driver.

21. The system according to claim 19, wherein the image capture device comprises a photodetector array that receives a filtered image from the acousto-optic tunable filter.

22. The system according to claim 21, wherein the processor receives multiple filtered images from the image capture device and the processor further combines the multiple filtered images to create a high contrast image.

23. The system according to claim 22, further comprising a monitor coupled to the processor that displays the high contrast image created by the processor.

24. The system according to claim 19, further comprising a frame grabber coupled to the image capture device.

25. The system according to claim 19, wherein the acousto-optic tunable filter receives an image from the objective lens, the liquid crystal achromatic rotator of light polarization and the multi-frequency generator drives the acousto-optic tunable filter to filter the image according to the filter coefficients calculated by the processor.

26. A method of real-time optical processing of images by simultaneously combining a variable set of images in selected spectral intervals comprising the steps of:
   selecting a set of spectral intervals;
   adjusting transmitting spectrum of an optical filter to a first selected spectral interval;
   acquiring a spectral image through the adjusted optical filter;
   repeating the above steps for each selected spectral interval;
   defining an object area;
   extracting object and background spectral parameters from the set of spectral images;
   monitoring spectral parameters of the background of an image;
   determining if the background spectral parameters deviate significantly from established background spectral parameters; and
   reextracting the object and background spectral parameters if the background spectral parameters deviate significantly from the established background spectral parameters;
   calculating an optimal set of weight coefficients for each spectral interval satisfying application criteria;
   adjusting a filter transmission spectrum to positive weight coefficients for corresponding spectral intervals to create a positive filter;
   capturing an image through the positive filter;
   adjusting a filter transmission spectrum to negative weight coefficients for corresponding spectral intervals to create a negative filter;
   capturing an image through the negative filter
   subtracting the image captured through the negative filter from the image captured through the positive filter;
   recording and displaying the resulting image.

27. The method of claim 26, further comprising cycling through the method of real time optical processing of images, wherein at least one of the number of spectral intervals, their position and the spectral width of each of these intervals can be varied in each cycle.

28. The methods of claim 26, further comprising acquiring a set of spectral images in various light polarizations.

29. A method for real time optical enhancement of imaging contrast comprising the steps of:
   acquiring a set of real time images;
   creating a translation from the set of real time images into a spectral representation of the set of real time images by using an acousto-optic filter;
   processing the spectral representation of the set of real time images into positive and negative discrete spectral coefficients to create a high contrast image determinant adaptive spectral filter;
   monitoring background spectral parameters of an image;
   determining if the background spectral parameters deviate significantly from established background spectral parameters;
   recreating a translation, reprocessing the spectral representation and retranslating the spectral representation if the background spectral parameters deviate significantly from the established background spectral parameters; and
   translating the spectral representation of the set of real time images into a high contrast image using the high contrast image determinant adaptive spectral filter.

30. The method of claim 29, further comprising choosing initial wavelengths for use in creating the translation.

31. The method of claim 29, wherein the step of determining if the background spectral parameters deviate significantly from the established background spectral parameters compares the background spectral parameters to a background vector.

32. The method of claim 29, further comprising targeting an object area on a spectral image.

33. The method of claim 29, further comprising subtracting images captured through a positive discrete spectral coefficient filter coefficient from images captured through a negative discrete spectral coefficient filter.

34. The method of claim 29, further comprising storing and displaying the high contrast image.

* * * * *